UNITED STATES PATENT OFFICE.

AUGUST LEOPOLD LASKA, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

YELLOW DISAZO DYES FOR COTTON AND PROCESS OF MAKING THEM.

1,094,448. Specification of Letters Patent. Patented Apr. 28, 1914.

No Drawing. Application filed August 16, 1913. Serial No. 785,017.

*To all whom it may concern:*

Be it known that I, AUGUST LEOPOLD LASKA, doctor of philosophy, chemist, and a citizen of the German Empire, and resident of Offenbach-on-the-Main, in the Grand Duchy of Hesse, (with the post-office address Wilhelmsplatz 18,) Germany, have invented new and useful Improvements in Yellow Disazo Dyes for Cotton and Processes of Making Them, of which the following is a specification.

My invention relates to the production of new azo dyestuffs which may be obtained by combining the diazo compound of a meta-substituted benzidin with two molecular proportions of an 1-aminophenyl-5-pyrazolone-3-carboxylic acid or with two molecular proportions of 1-nitrophenyl-5-pyrazolone-3-carboxylic acid and reducing the nitro groups to amido groups. These dyestuffs, having probably the following formula:

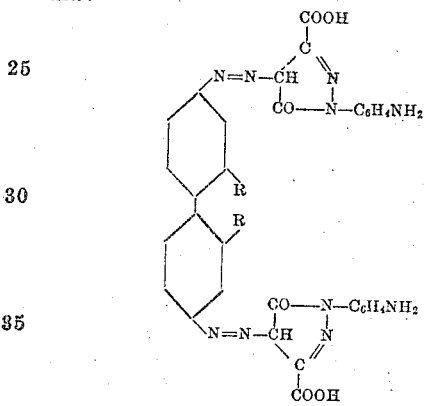

wherein R means Cl or $CH_3$, are, when dry, orange to red powders, soluble in concentrated sulfuric acid with a yellowish red to red tone, yield upon reduction with stannous chlorid and hydrochloric acid a meta-substituted benzidin and a 1-aminophenyl-4-amino-5-pyrazolone-3-carboxylic acid, and dye cotton yellow to reddish yellow shades, which are turned into a brilliant orange and red, respectively, by the diazotation on the fiber and the combination with beta-naphthol.

Under the term "meta-substituted benzidin" I include meta-substitution products of benzidin of the formula:

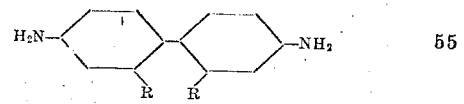

wherein R means Cl or $CH_3$.

In order to illustrate the new process more fully, the following examples are given, the parts being by weight:

Example I: 6.3 parts of meta-meta¹-dichlorobenzidin ($NH_2$ : Cl—1 : 3) are dissolved in 250 parts of hot water and 22.8 parts of hydrochloric acid of 20° Bé., filtered, if necessary, and after cooling down with ice diazotized with a concentrated solution of 3.45 parts of sodium nitrite. The tetrazo solution, thus obtained, is poured into a solution, cooled with ice, of 12.5 parts of 1-meta-nitrophenyl-5-pyrazolone-3-carboxylic acid in 7 parts of caustic soda lye of 35° Bé. and 200 parts of water, to which a concentrated solution of 15 parts of calcinated soda is added. When the combination is complete, the mixture is heated to 50° and maintained for an hour at 55–60° after addition of a solution of 36 parts of sodium sulfid in 100 parts of water. Then the dyestuff, thus obtained, is precipitated with common salt. The same dyestuff is formed by combining the aforesaid tetrazo solution in soda alkaline solution with 1-meta-aminophenyl-5-pyrazolone-3-carboxylic acid. It forms, when dry, an orange powder, soluble in concentrated sulfuric acid with a yellowish red tone. It dyes cotton yellow shades turning into a brilliant orange after the diazotation and combination with beta-naphthol.

Example II: 10.6 parts of meta-tolidin are dissolved in 200 parts of water and 27 parts of hydrochloric acid of 20° Bé. and, after cooling with ice, diazotized with a solution of 6.9 parts of sodium nitrite. The tetrazo solution, thus obtained, is poured in a solution, cooled with ice, of 25 parts of 1-meta-nitrophenyl-5-pyrazolone-3-carboxylic acid, 23 parts of caustic soda lye of 35° Bé. and 30 parts of calcinated soda in 200 parts of water. When the combination is complete, the mixture is heated to 50° and stirred for an hour at 55–60° after addition of a solution of 72 parts of sodium sulfid in 150 parts of water. Then the dyestuff, thus obtained, is precipitated with common salt. The same dyestuff is obtained by combining the tetrazotized meta-tolidin with 1 - meta - aminophenyl - 5 - pyrazolone - 3 - carboxylic acid in soda alkaline solution. It forms, when dry, a red powder, soluble in concentrated sulfuric acid with a yellowish red tone. It dyes cotton reddish yellow shades turning into a brilliant orange by the diazotation and combination with beta-naphthol.

By combining the 1-para-nitrophenyl-5-pyrazolone-3-carboxylic acid with the tetrazotized meta-tolidin and by reducing afterward a dyestuff is obtained, which forms, when dry, a dark red powder, soluble in concentrated sulfuric acid with a red tone, and dyes cotton also reddish yellow shades and gives a yellowish red by the diazotation and combination with beta-naphthol.

Now what I claim and desire to secure by Letters Patent is the following:

1. The process of making yellow disazo dyes for cotton consisting in combining the tetrazo compound of a meta-substituted benzidin with two molecular proportions of a 1 - nitrophenyl - 5 - pyrazolone - 3 - carboxylic acid, and reducing the nitro groups to amino groups.

2. As new articles the dyestuffs, which may be obtained by combining the tetrazo compound of a meta-substituted benzidin with two molecular proportions of a 1-nitrophenyl-5-pyrazolone-3-carboxylic acid and reducing the nitro groups to amino groups, which dyestuffs are, when dry, orange to red powders, soluble in concentrated sulfuric acid with a yellowish red to red tone, yielding upon reduction with stannous chlorid and hydrochloric acid a meta-substituted benzidin and a 1-aminophenyl-4-amino-5-pyrazolone-3-carboxylic acid, and dye cotton yellow to reddish yellow shades, turning into a brilliant orange to red, by the diazotation on the fiber and the combination with beta-naphthol.

3. As new articles the dyestuffs, which may be obtained by combining the tetrazo compound of meta-meta¹-dichlorobenzidin ($NH_2:Cl=1:3$) with two molecular proportions of a 1-nitrophenyl-5-pyrazolone-3-carboxylic acid, and reducing the nitro groups to amido groups, which dyestuffs, having in form of free acid probably the formula:

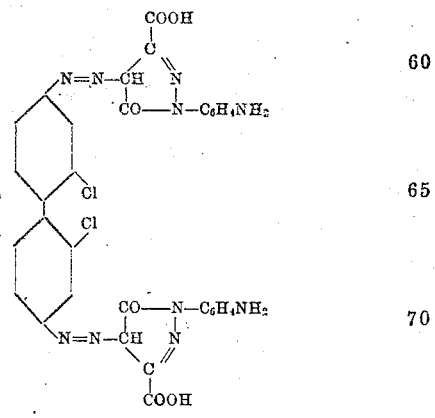

form, when dry, orange powders, soluble in concentrated sulfuric acid with a yellowish red tone, yielding upon reduction with stannous chlorid and hydrochloric acid meta-dichlorobenzidin and a 1-aminophenyl-4-amino-5-pyrazolone-3-carboxylic acid, and dye cotton yellow shades, turning into a brilliant orange by the diazotation on the fiber and the combination with beta-naphthol.

In testimony, that I claim the foregoing as my invention, I have signed my name in presence of two witnesses, this thirty-first day of July, 1913.

AUGUST-LEOPOLD LASKA.

Witnesses:
 PETER LAUTENSCHLÄGER,
 FRITZ DÉSOR.